June 28, 1949.　　　　　L. R. APARICIO　　　　　2,474,712
VARIABLE FILTER SCREEN
Filed Jan. 18, 1946
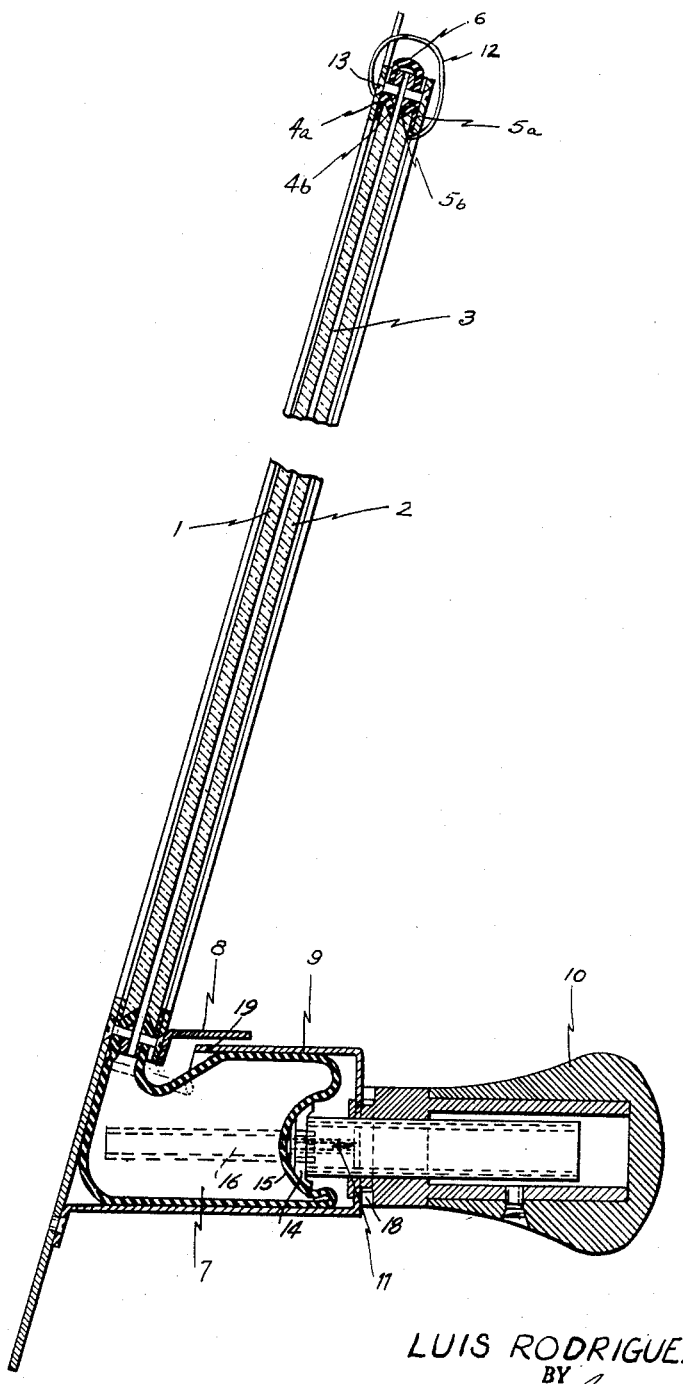
INVENTOR.
LUIS RODRIGUEZ APARICIO
BY
ATTORNEY Patented June 28, 1949

2,474,712

UNITED STATES PATENT OFFICE 2,474,712

VARIABLE FILTER SCREEN

Luis Rodriguez Aparicio, Madrid, Spain

Application January 18, 1946, Serial No. 641,972
In Spain June 19, 1945

17 Claims. (Cl. 88—60)

This invention relates to transparent radiation filter screens and is particularly directed to a device of such kind wherein the absorption and filtering action, and consequently the intensity of radiation passed, are variable to suit different conditions and requirements.

Conventional radiation filter screens, such as light glare reducing screens for vehicle windows, photographic filters, etc., have a fixed density and absorption characteristics. A single screen cannot operate properly under all light conditions. Also, when filtering is not required the screen must be removed from the light path. If greater or less absorption is required, a filter screen of different characteristics must be employed.

According to the present invention, these limitations and objections to conventional filter screens are overcome by providing a screen of variable density and absorption characteristics. Any desired amount of radiation can be passed from a radiation source of any intensity. Likewise, the screen may be made non-absorptive so that radiation can be transmitted through the screen in its original condition and the screen may remain in the radiation path under all conditions.

Generally described, the invention comprises opposing parallel members of glass or other transparent material mounted for movement laterally to and from each other. A fluid filter medium is introduced between the members to form a filter layer therebetween of the thickness required to secure the desired filtering action as the transparent members are adjustable specifically to accommodate the filter layer. When filtering is not desired, the transparent members, which themselves have no filtering function, are moved into face-to-face contact so that no filtering layer exists between them.

The fluid filter medium is stored in a closed reservoir directly communicating with the space between the transparent members and in sealing connection with opposing margins of the respective members so that the whole forms a hermetically sealed and self-contained unit. The filter medium reservoir is of flexible material and so constructed that the transparent members may be moved to and from each other while maintaining their parallelism. Obviously, if the members are not maintained in parallel relation under all conditions, the thickness of the layer of filter medium and the filtering action in the space between will not be the same in all areas of the screen.

The reservoir communicates with the transparent members along its entire length. Instead of limiting the length of the reservoir to a limited portion of the periphery of the screen, it is desirable to extend the reservoir around the entire periphery of the screen. Such arrangement enables filter medium to be introduced between the transparent members simultaneously from all sides so that all areas of the screen are apparently changed simultaneously. Also, since the pressure of the fluid medium in all areas of the reservoir is the same under all conditions, the flow of filter medium between the reservoir and the space between the transparent members can be accomplished without disturbing the parallelism of the members.

The above and other features and advantages of the invention will be more fully understood by reference to the embodiment shown in the accompanying drawing, now to be described.

The form of the invention illustrated is intended as a light glare reducing screen for use in conjunction with vehicle windows. The same includes a pair of rigid transparent members 1 and 2 of rigid glass or other suitable transparent material and mounted in opposing relation for movement laterally to and from each other to provide between them a space 3 of variable width.

Framing the transparent members and communicating with the space between them on all sides is a reservoir 6 of relatively thin flexible material, preferably rubber. The reservoir forms a filter medium storage channel around the transparent members. To accommodate adequate filter medium to fill the space between transparent members in their maximum spaced position, reservoir 6 includes a portion of relatively large cross-section along the bottom of the transparent members forming a main storage chamber 7. As shown, the reservoir in other portions may be of substantially smaller cross-section and capacity.

The mounting for the transparent members 1 and 2 and reservoir 6 includes a rigid main frame 4a. The adjacent inner margin of the reservoir and the margin of transparent member 1 are secured in sealing engagement with each other and secured to frame 4a by an inner rigid clamping frame 4b. The inner margin of the reservoir is bifurcated and the margin of transparent member 1 is beveled and inserted in the bifurcation to insure a fluid pressure tight seal under all conditions. Inner clamping frame 4b is similarly beveled and is interconnected with main frame 4a at recurrent points by securing elements such as screws 13.

The opposite inner margin of reservoir 6 is likewise bifurcated behind and secured in sealing engagement with the beveled margin of transparent member 2 and to movable rigid frame member 5a by an inner beveled clamping frame 5b.

By reason of the flexibility of reservoir 6 the same may deform laterally and permit transparent member 2 and its associated frames 5a and 5b to move to and away from transparent member 1 and frames 4a and 4b. Because of the beveled connection between the transparent members, the reservoir margins and clamping rings 4b and 5b, and because the latter frame members are of lesser thickness than the transparent members such members can be moved into face-to-face contact.

The large lower portion of reservoir 6 is supported in a rigid housing 9 extending lengthwise of the bottom of the transparent members and supported by frame member 4a. Such portion of the reservoir is collapsed to develop fluid pressure in the filter medium throughout the reservoir and force it into space 3 between the transparent members 1 and 2 from all sides thereof. To collapse the reservoir a pressure member 14 is mounted in housing 9 for lateral movement in engagement with rear wall 15 of the reservoir. Pressure member 14 may be mounted for lateral movement in any suitable manner, as by means of guide tracks 16 at the opposite ends of such member. Adjustment of the pressure member is accomplished through a rotatable handle 10 having flanged inner end 17 secured for rotation in aperture in housing 9 by a locking ring 18. Secured to pressure member 14 and, as diagrammatically illustrated, in screw threaded engagement with handle 10 is an actuating shaft 11.

When handle 10 is rotated in one direction actuating shaft 11 and pressure member 14 are forced laterally inwardly to collapse the portion of the reservoir contained in housing 9 and force filter medium from the entire reservoir between the transparent members 1 and 2. The farther the reservoir is collapsed the greater the amount of filter medium forced between the transparent members. The pressure of the filter medium serves to force the transparent members apart. The inner edge 19 of the upper wall of housing 9 is located in spaced relation to the parts associated with the margin of movable transparent member 2 so as to permit free movement of the latter. The resulting gap may be provided with a protective cover strip 8 secured to the lower side of frame member 5a in any suitable manner.

A series of pressure springs embrace frame members 4a and 5a at suitable points and are adapted to move transparent members 1 and 2 together when handle 10 is actuated to permit the return of filter medium from space 3 to the members together and force the filter medium back into the reservoir. Thus through co-action of springs 12 and actuating handle 10 the amount of filter medium introduced into the space between the transparent members or removed therefrom can be varied to any desired degree between zero and maximum capacity.

The filter medium which fills the reservoir 6 may be a gas. Preferably, however, it will be a liquid containing a natural tinted color in solution or suspension. The liquid selected will depend on the particular use to which the filter screen is to be put and upon temperature conditions. Such liquids as water, alcohol, glycol, glycerine, gasoline, benzine, paraffin, and similar liquids may be employed. The coloring agent will be determined by the character and amount of absorption desired; also, it will be determined by whether the intensity of the whole or part of visible or invisible bands of the light spectrum is to be reduced or eliminated. In some cases a coloring agent will be employed which will accentuate the contrast of objects viewed through the filter screen.

The form of the invention illustrated is merely exemplary and is subject to considerable modification and equivalency. For example, regulation of the spacing of the transparent members may be effected by external means instead of through the pressure of the filter medium. While the screen shown is intended for use as a glare screen in conjunction with the windows of vehicles, including automobiles, railroad cars, aeroplanes, ships, etc., the invention may also be employed for windows of buildings and the like for darkening purposes, in measuring apparatus requiring the clarity of light from a luminous source to be adjusted to a determined value, in optics and photography, for stage and other lighting, in conjunction with illuminated advertisements, etc.

I claim:

1. A variable filter screen comprising a pair of rigid, opposing parallel transparent members laterally movable to and from each other, means operative to laterally move the transparent members together from spaced relation; a variable capacity closed flexible thin-walled reservoir housing a storage compartment outwardly of the margins of the transparent members for filter fluid, elongated and having laterally separable margins in fluid-tight connection with opposing margins of the transparent members along one entire side thereof, and means for varying the capacity of the reservoir and adapted to cause filter fluid to flow between the reservoir and the space between the transparent members along said entire side thereof.

2. A variable filter screen comprising a pair of rigid, opposing parallel transparent members laterally movable to and from each other, means operative to laterally move the transparent members together from spaced relation; a deformable closed flexible thin-walled reservoir housing a storage compartment outwardly of the margins of the transparent members for filter fluid and of fluid-tight, flexible material, elongated and having laterally separable margins in fluid-tight connection with opposing margins of the transparent members along one entire side thereof, and means for compressing the reservoir and adapted to force filter fluid from the reservoir between the transparent members along said entire side thereof.

3. A variable filter screen comprising a pair of rigid, opposing parallel transparent members laterally movable to and from each other, means operative to laterally move the transparent members together from spaced relation; a deformable closed flexible thin-walled reservoir housing a storage compartment outwardly of the margins of the transparent members for filter fluid, elongated and having laterally separable margins in fluid-tight connection with the opposing margins of the transparent members along one entire side thereof, and means for compressing the reservoir substantially throughout its length and adapted to force filter fluid from the reservoir between the transparent members simultaneously and uniformly along said entire side of said members.

4. A variable filter screen comprising a pair of rigid, opposing parallel transparent members laterally movable to and from each other, means operative to laterally move the transparent members together from spaced relation; a deformable closed flexible thin-walled reservoir of flexible material housing a storage compartment for filter fluid outwardly of the margins of the transparent members and having laterally separable margins in fluid-tight connection with opposing margins of the transparent members, and means adapted to force filter fluid from the reservoir between the transparent members comprising a movable pressure member engageable with the reservoir and actuating means coactive with the pressure member to compress the reservoir.

5. A variable filter screen comprising a pair of rigid, opposing parallel transparent members laterally movable to and from each other, means operative to laterally move the transparent members together from spaced relation; a deformable closed flexible thin-walled reservoir housing a storage compartment for filter fluid outwardly of the margins of the transparent members and having laterally separable margins in fluid-tight connection with the margins of the transparent members, a movable pressure member engageable with the reservoir, a rotatable member and screw-operated means responsive to rotation of said rotatable member to cause said pressure member to variably compress the reservoir and adapted to cause a variable amount of filter fluid to be forced from the reservoir between the transparent members.

6. A variable filter screen comprising a pair of rigid, opposing parallel transparent members mounted for relative lateral movement to and from each other, means for laterally moving the transparent members together from spaced relation, a closed flexible thin-walled reservoir of flexible, fluid-tight material extending along at least one of the side margins of the transparent members housing a storage compartment for filter fluid outwardly of the margins of the transparent members and having an elongated deformable mouth defined by opposing laterally separable inner wall margins secured in fluid-tight contact with the margins of the transparent members along said side and adapted to contain a filter fluid for delivery between the transparent members, pressure means adapted to force filter fluid from the reservoir between the transparent members and laterally deformable, fluid-tight means sealing the margins of the transparent members along the remaining sides of the sheets.

7. A variable filter screen comprising a pair of rigid, opposing parallel transparent members laterally movable to and from each other, means operative to laterally move the transparent members together from spaced relation; a closed peripheral flexible thin-walled reservoir surrounding the transparent members outwardly of the margins thereof and having inwardly extending, laterally separable opposite walls in fluid-tight connection with the margins of the transparent members, said reservoir being adapted to contain filter fluid and to deliver filter fluid under pressure inwardly therefrom between the transparent members simultaneously from all peripheral areas of the reservoir, and pressure means adapted to force filter fluid from the reservoir between the transparent members.

8. A variable filter screen comprising a pair of rigid, opposing parallel transparent members laterally movable to and from each other, means operative to laterally move the transparent members together from spaced relation; a closed and readily deformable peripheral flexible thin-walled reservoir of relatively thin, flexible material surrounding the transparent members housing a storage compartment for filter fluid outwardly of the margins of the transparent members and having opposite inner wall margins in fluid-tight connection with the margins of the transparent members, and pressure means adapted to force filter fluid from the reservoir between the transparent members.

9. A variable light filter screen comprising a pair of rigid, opposing parallel transparent members mounted for relative lateral movement to and from each other, means operative to laterally move the transparent members together from spaced relation, a laterally extensible flexible thin-walled reservoir of fluid-tight, flexible material surrounding the transparent members having opposite inner wall margins in fluid-tight connection with the margins of the respective transparent members and housing a storage compartment outwardly of the margins of the transparent members adapted to contain a filter fluid for delivery between the transparent members when said members are in spaced relation, said reservoir being in continuous communication with the transparent members around the entire periphery thereof, an elongated adjustable pressure member engageable with the portion of the reservoir along one side of the transparent members substantially throughout its entire length, and actuating means for causing said pressure member to adjustably compress said reservoir to force filter fluid in varying amount from all portions of the reservoir between the transparent members.

10. A variable filter screen comprising a pair of rigid, opposing parallel transparent members mounted for relative lateral movement to and from each other, means for laterally moving the transparent members together from spaced relation, a closed peripheral flexible thin-walled reservoir surrounding the transparent members having opposite laterally separable inner wall margins in fluid-tight connection with the margins of the respective transparent members and housing a storage compartment outwardly of the margins of the transparent members and adapted to contain a filter fluid, said reservoir including a compressible portion of relatively large cross-section and capacity along at least one side of the transparent members and a portion of shallow cross-section and smaller capacity along the other sides of the transparent members, and pressure means for compressing the portion of the reservoir of larger capacity so as to force filter fluid from all portions of the reservoir between the transparent members.

11. A variable filter screen comprising a pair of rigid, transparent members mounted for relative lateral movement to and from face to face contact and parallel, spaced-relation, spring means yieldingly urging the transparent members together and operative to move the transparent members laterally from spaced parallel relation into face to face contact, a laterally extensible flexible thin-walled reservoir of fluid-tight, flexible material having opposite laterally separable inner wall margins in fluid-tight connection with opposing margins of the transparent members and adapted to contain a filter fluid for delivery between the transparent members when said members are in spaced relation, and pressure means adapted to deliver filter fluid from the reservoir between the transparent members.

12. A variable light filter screen comprising a pair of rigid, opposing parallel transparent members mounted for relative lateral movement to and from each other, means operative to move said members laterally from spaced relation into contact, a laterally extensible flexible thin-walled reservoir of flexible, fluid-tight material having opposite inner wall margins and housing a storage compartment outwardly of the margins of the transparent members adapted to contain a filter fluid, clamping means securing the inner wall margins of the reservoir in fluid-tight engagement with the margins of the respective transparent members, and pressure means adapted to force filter fluid from the reservoir between the transparent members.

13. A variable screen comprising a pair of rigid, opposing parallel transparent members mounted for relative lateral movement to and from each other, means operative to move the members together from spaced relation, a closed flexible thin-walled reservoir surrounding the transparent members and housing a storage compartment outwardly of the margins of the transparent members adapted to contain a filter fluid, flexible, opposite inner walls on the reservoir, interconnected inner and outer clamping members located on opposite faces of each sheet clamping said opposite marginal walls in fluid-tight engagement with the margins of the respective transparent members, said margins being of reduced thickness at their margins to provide channels on their inner sides which accommodate the inner clamping members so that the transparent members can make face to face contact, and pressure means for forcing fluid from the reservoir between the transparent members.

14. A variable filter screen comprising a pair of rigid, opposing parallel transparent members mounted for relative lateral movement to and from each other, means operative to laterally move the members together from spaced relation, a closed flexible thin-walled reservoir of flexible, fluid-tight material surrounding the transparent members and housing a storage compartment outwardly of the margins of the transparent members adapted to contain a filter fluid for delivery between the transparent members, opposite bifurcated inner flexible margins on the reservoir embracing and in fluid-tight engagement with the margins of the respective transparent members, and means for compressing the reservoir so as to force filter fluid between the transparent members.

15. A variable filter screen comprising a pair of opposing, parallel transparent members mounted for relative lateral movement to and from each other, means operative to move the members together from spaced relation, a flexible thin-walled reservoir of fluid-tight material surrounding and bordering the transparent members and housing a storage compartment outwardly of the margins of the transparent members adapted to contain a filter fluid, flexible, opposite inner marginal walls on the reservoir bifurcated so as to embrace the margins of the respective transparent members, interconnected inner and outer clamping members clamping the inner and outer portions of the bifurcated marginal walls of the reservoir in fluid-tight engagement with the margins of the respective transparent members, the transparent members being of reduced thickness at their margins to provide channels on their inner sides which accommodate the inner portions of the bifurcated reservoir walls and the inner clamping members so that the transparent members can make face to face contact, and pressure means for forcing filter fluid between the transparent members.

16. A filter fluid reservoir for variable filter screens of the type comprising laterally separable, opposing transparent members adapted to receive filter fluid therebetween, said reservoir comprising a molded hollow flexible thin-walled frame-like endless body of flexible, fluid-tight plastic material housing a storage compartment adapted to extend around and outwardly of the entire periphery of a filter screen and store filter fluid, said body having a laterally adjustable fluid delivery mouth extending around its inner side formed by inwardly extending, separable, opposing marginal walls adapted to be secured to the margins of the respective transparent members of a filter screen.

17. A filter fluid reservoir for variable filter screens of the type comprising laterally separable, opposing transparent members adapted to receive filter fluid therebetween, said reservoir comprising a molded hollow flexible thin-walled frame-like endless body of flexible, fluid-tight plastic material housing a storage compartment adapted to extend around the periphery of a filter screen and store filter fluid, said body having a laterally adjustable mouth extending around its inner side formed by inwardly extending, separable, opposing marginal walls adapted to be secured to the margins of the respective transparent members of a filter screen and said body including a collapsible portion of enlarged hollow cross-section and adapted upon compression when filled with filter fluid to force fluid out through the mouth around the entire area of the reservoir.

LUIS RODRIGUEZ APARICIO.

REFERENCES CITED

The following references are of record in the file of this patent:

UNITED STATES PATENTS

| Number | Name | Date |
|---|---|---|
| 504,890 | Ohmart | Sept. 12, 1893 |
| 695,606 | Grun | Mar. 18, 1902 |
| 1,269,422 | Gordon | June 11, 1918 |
| 1,515,389 | Hopkins | Nov. 11, 1924 |
| 1,780,773 | Wearham | Nov. 4, 1930 |
| 1,782,328 | Wearham | Nov. 18, 1930 |
| 1,940,040 | Arms | Dec. 19, 1933 |
| 2,300,251 | Flint | Oct. 27, 1942 |
| 2,373,214 | Wolkenhauer | Apr. 10, 1945 |

FOREIGN PATENTS

| Number | Country | Date |
|---|---|---|
| 8206/32 | Australia | July 20, 1933 |